(No Model.)
A. W. McFARLAND.
EGG AND PACKING SEPARATOR.
No. 556,431. Patented Mar. 17, 1896.
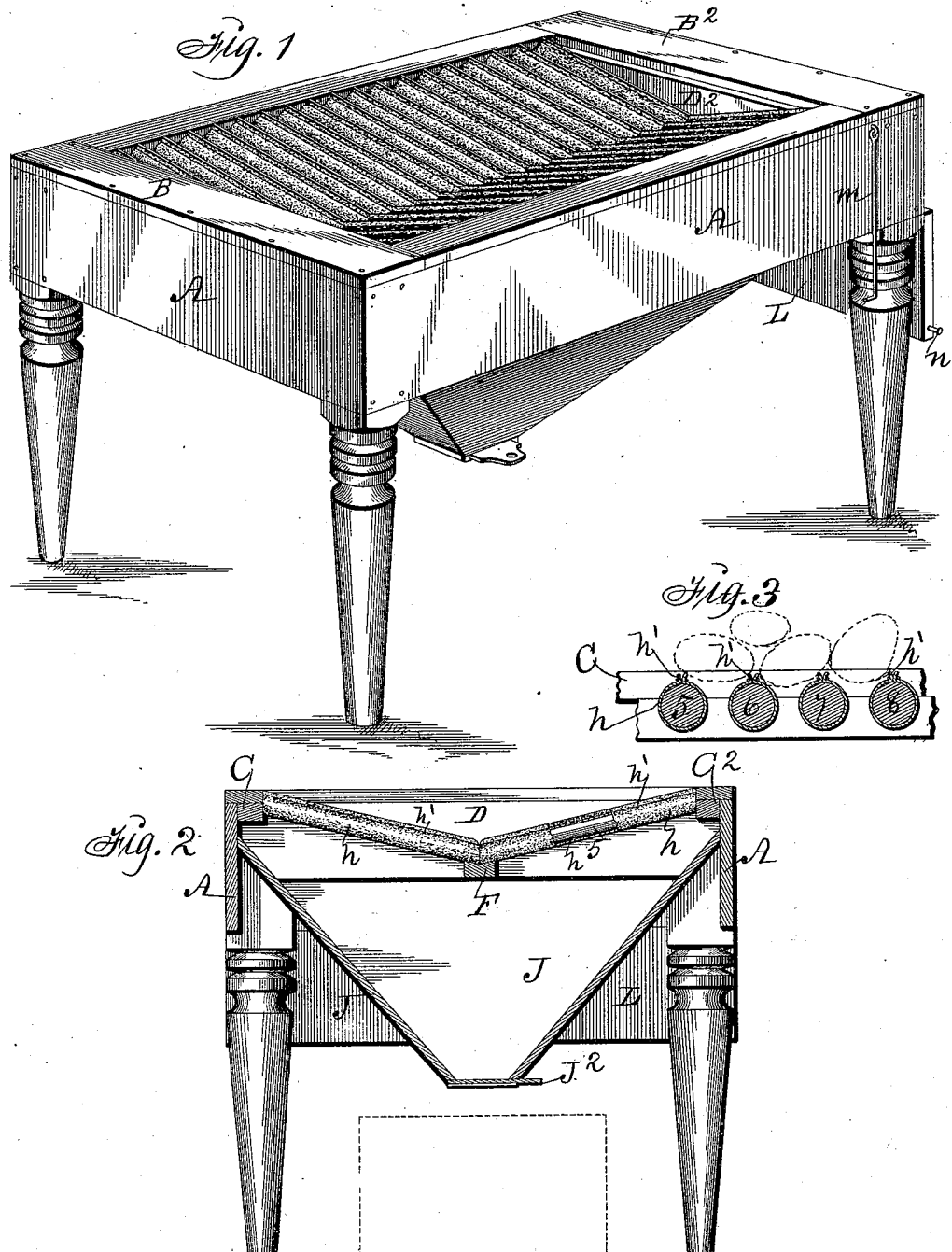

UNITED STATES PATENT OFFICE.

ARTHUR W. McFARLAND, OF WEST BEND, IOWA.

EGG AND PACKING SEPARATOR.

SPECIFICATION forming part of Letters Patent No. 556,431, dated March 17, 1896.

Application filed November 21, 1895. Serial No. 569,744. (No model.)

*To all whom it may concern:*

Be it known that I, ARTHUR W. McFAR-LAND, a citizen of the United States of America, residing at West Bend, in the county of Palo Alto, in the State of Iowa, have invented a new and useful Egg and Packing Separator, of which the following is a specification.

My object is to facilitate the removal of eggs from the packing material in which they are carried to market in baskets and such other receptacles as are used by farmers delivering eggs to merchants.

My invention consists in a portable stand adapted for emptying a basket of eggs and the chaff, oats, sawdust, or such other material in which they may be packed into its top to retain the eggs in convenient position to be counted and removed, while at the same time the packing material will be gathered by force of gravity into a chamber, from whence it can be readily removed at pleasure to be replaced in the basket or receptacle from which it had been emptied with the eggs or otherwise disposed of.

In the accompanying drawings, Figure 1 is a perspective view of my complete invention ready for practical use. Fig. 2 is a transverse sectional view showing the construction and relative positions of a rack adapted for supporting a collection of eggs in an exposed and accessible position and a receptacle under the rack for receiving and retaining packing material in such a manner that it can be readily withdrawn therefrom and replaced into the basket from whence it was emptied with the eggs or otherwise disposed of. Fig. 3 is an enlarged detail view showing the construction of the rack adapted to receive and support eggs without breaking their shells and also adapted for separating the packing material from the eggs.

By thus covering the bars of a rack with tubes composed of a flexible material by sewing the overlying parallel edges thereof together to jointly project outward and upward in the rack they are readily applied by slipping them endwise over the bars, and the construction of the rack is facilitated and thereby specially adapted to serve as a yielding support for eggs that come in direct contact with the upwardly-projecting edges of the tubes on the bars, so that the weight of other eggs on top of them will not crush their shells, as frequently occurs when wire screens are used for separating packing from eggs.

The letter A designates an open-topped portable stand adapted to support a separating screen, grate, or rack fitted in the open top. It is preferably oblong in shape, and may vary in size, as desired.

B and B² are cross-pieces fixed on the top and ends of the frame of the stand that has fixed legs at its corners.

C and C² are the parallel sides of the frame of the removable rack adapted to fit on the parallel sides of the frame of the stand, and D and D² are cross-pieces fixed to the ends of the sides and adapted in shape to enter the ends of the open-topped stand and to fit and rest upon the inclined walls of the receptacle under the rack, as clearly shown in Fig. 2.

F is a brace fixed to the bottom portions and longitudinal centers of the cross-pieces D and D² to support rack-bars in inclined positions.

5 6 7 8 represent cushioned rack-bars fixed to the side pieces C and C² at their upper and outer ends and to the brace or support F at their lower and inner ends.

Each rack-bar is covered with flexible cushioning material $h$ and the overlying edges and seams $h'$ of the flexible material (preferably felt cloth) on top and extending upward to allow eggs to rest thereon, as indicated by dotted lines in Fig. 3, and as required to prevent egg-shells from being broken by contact with a rigid inflexible support.

J represents a receptacle fixed to the frame of the stand and under the rack to receive the packing material emptied upon the rack with the eggs and that separates from the eggs and drops through the rack into the receptacle. It is preferably in the form of a hopper and provided with an opening and slide J², fitted in bearings fixed thereto in such a manner that the packing can be readily emptied from the receptacle by withdrawing the slide.

L represents a board or table hinged to the end and bottom portion of the frame of the stand A in such a manner that it can be readily retained in a horizontal position by means of rods $m$, pivotally connected with the sides of the stand and provided with hooks on their ends to engage pins $n$, fixed to the ends of the table. The adjustable table thus provided is adapted for supporting baskets or other receptacles in a convenient position for placing eggs therein as they are taken from the rack and counted.

I am aware separator-screens have been made of wire and the wire wrapped with flexible material; but in no instance have flexible tubes been made and combined with the bars of a rack to accomplish the results contemplated by my invention.

I claim as my invention—

1. In an egg and packing separator, a flexible tube having parallel edges connected and projected outward in combination with the bar of a rack, in the manner set forth, for the purposes stated.

2. An egg and packing separator comprising an open-topped stand, a rack composed of parallel bars covered with flexible tubes and the seams of the tubes projecting upward, a hopper under the rack and an adjustable table or basket-support hinged to the stand, substantially as shown and described.

ARTHUR W. McFARLAND.

Witnesses:
J. P. BECKER,
J. N. PHILLIPS.